United States Patent [19]

Curtis, Jr. et al.

[11] 4,106,463
[45] Aug. 15, 1978

[54] DOUBLE TAPER PISTON

[75] Inventors: John Markley Curtis, Jr., Baltimore; Paul Roberts Shepler, Towson, both of Md.

[73] Assignee: Koppers Company, Inc., Pittsburgh, Pa.

[21] Appl. No.: 763,935

[22] Filed: Jan. 31, 1977

[51] Int. Cl.² .............................................. F02F 3/00
[52] U.S. Cl. .................................. 123/193 P; 92/182
[58] Field of Search ......... 123/193 R, 193 P, 193 CP; 92/172, 182, 192, 208, 209, 213, 176

[56] References Cited

U.S. PATENT DOCUMENTS

| 1,857,077 | 5/1932 | Adamson | 92/176 |
| 1,953,109 | 4/1934 | Heron | 92/176 |
| 2,662,515 | 12/1953 | Bodine | 92/208 |
| 2,837,384 | 6/1958 | Johnson | 92/208 |
| 2,845,917 | 8/1958 | Laubender | 123/193 P |
| 2,857,220 | 10/1958 | Jonkers | 92/209 |
| 2,947,582 | 8/1960 | Laagewaard | 92/176 |
| 3,104,922 | 9/1963 | Baster | 123/193 P |
| 3,645,174 | 2/1972 | Prasse | 92/182 |
| 3,834,719 | 9/1974 | Shin | 92/182 |

FOREIGN PATENT DOCUMENTS

| 778,119 | 3/1936 | France | 123/193 P |
| 722,762 | 1/1955 | United Kingdom | 92/176 |

Primary Examiner—Charles J. Myhre
Assistant Examiner—Jeffrey L. Yates
Attorney, Agent, or Firm—Thomas L. Sivak; Oscar B. Brumback

[57] ABSTRACT

A piston for an internal combustion engine having a double tapered top land to provide controlled variation in the clearance about the head of the piston. The controlled variation in clearance about the piston head provides a sufficiently sized orifice which prevents the formation of hard carbon and improves oil control without greatly increasing pollutants.

7 Claims, 5 Drawing Figures

DOUBLE TAPER PISTON

BACKGROUND OF THE INVENTION

1. Field of Invention

This invention relates to pistons for use in internal combustion engines. More particularly, it relates to a piston for use in a diesel engine having a double tapered top land which provides for controlled variation in clearance between the piston and cylinder wall above the top compression ring of the piston.

2. Description of the Prior Art

For many years it was the practice of diesel engine designers to minimize the clearance between the piston and cylinder wall in an attempt to prevent the accumulation of carbon deposits about the piston. These close clearances failed to reduce hard carbon and thus oil consumption was adversely affected. Further, the hard carbon build-up caused ring and liner wear thereby shortening the effective life of the engine.

Recently, it has been found that by manufacturing the piston with a relatively large set back for the top land and thereby providing a relatively large annular space about the piston head above the top ring, load bearing carbon deposits could be minimized without affecting the seal provided by the top ring. While this piston design achieved the desired result of reducing oil consumption and wear, other aspects of engine performance such as emissions, smoke, and fuel consumption were adversely affected.

SUMMARY OF THE INVENTION

The present invention overcomes the foregoing problems of the prior art. Our invention minimizes the build-up of adherent load-bearing carbon around the piston, allows high gas pressure to aid the integrity of the top compression ring, provides excellent oil control and permits more complete combustion of the fuel in the cylinder thus reducing polluting emissions and smoke.

The foregoing is accomplished by providing a piston having a top land above the top compression ring which has a zoned diameter wherein the largest diameter of the top land falls between the lesser diameters. The zones can be formed from three frusto-conical sections. The first section which diverges outwardly 1° to 20° from the axis of the piston and comprises 10% to 40% of the vertical surface above the top compression ring. The second portion extends from the first portion, is substantially parallel to the axis of the piston and comprises 10% to 50% of the vertical surface above the top ring. The third section extends from the second section and diverges inwardly 1° to 20° toward the axis of the piston and comprises 40% to 70% of the vertical surface above the top compression ring. The zoned diameter may also be formed by an arcuate surface having its axis in an horizontal plane.

In a preferred embodiment, the uppermost taper comprises 20% of the vertical height of the head above the top compression seal and is tapered 6° from the vertical toward the axis of the piston. The midsection, which comprises 25% of the vertical height of the head above the top compression ring, is substantially parallel with the axis of the piston. This portion of the top land reduces the dead volume in the combustion cavity and thereby reduces the amount of unspent fuel and correspondingly reduces polluting emissions and smoke. Further, the midsection helps eliminate the passage of fuel to the top compression ring and thereby reduces carbon build-up and correspondingly reduces oil consumption. The lowermost taper comprises 55% of the vertical height of the head above the top compression ring and is tapered 3° from the vertical. The taper of the lower section causes the upper plan of the groove that receives the top compression ring to be narrower than the lower plan. The larger annular cavity above the top compression ring enhances the integrity of the seal by permitting an earlier gas loading above and behind the compression ring.

DESCRIPTION OF THE PREFERRED EMBODIMENT

Figure 1:
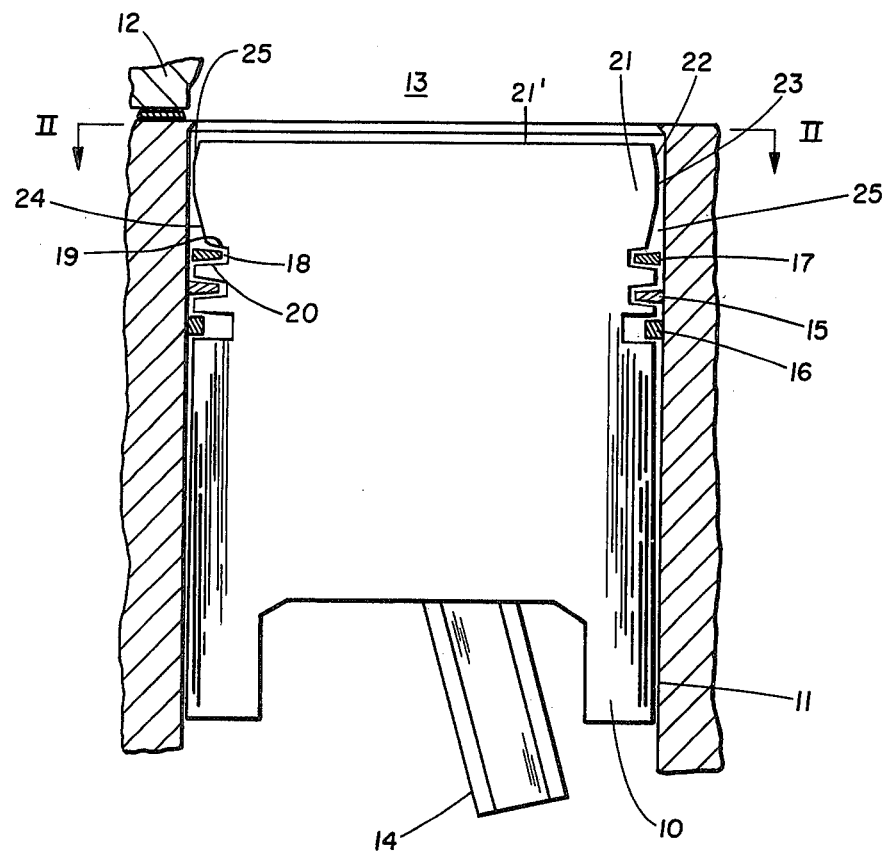
FIG. 1 is an elevational view partially in section of a cylinder with a piston embodying the present invention.
Figure 2:
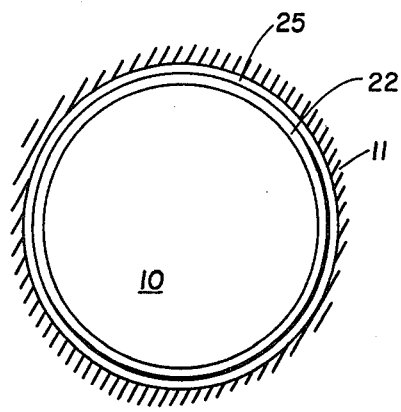
FIG. 2 is a sectional view taken along lines II—II of FIG. 1.
Figure 3:
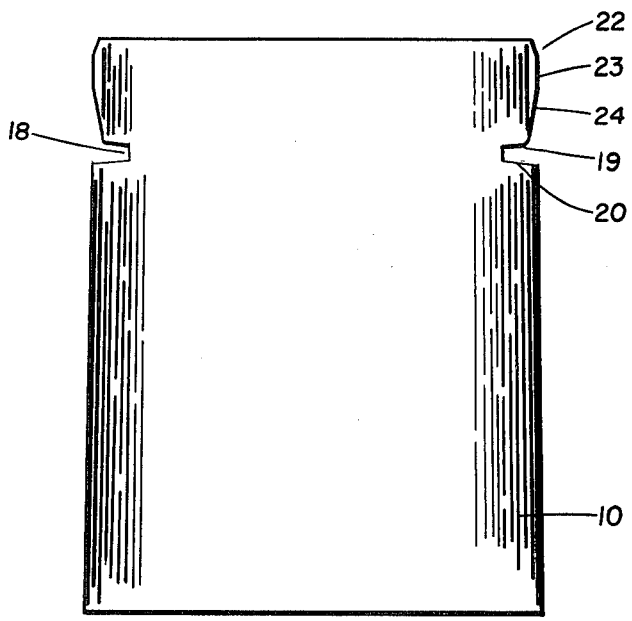
FIG. 3 is a plan elevational view of a piston embodying the present invention.

Referring to the drawings, FIG. 1 shows a piston slidably mounted in cylinder 11, which, together with the head 12, define the combustion chamber 13 of a diesel or natural gas engine, not illustrated. Piston 10 has a connecting rod 14 fixably attached to it by means well known and understood in the art. Rod 14 is connected to a crank shaft, not shown, in a conventional way. Piston 10 has a conventional compression ring 15 and oil ring 16. Top compression ring 17 is mounted in groove 18. Groove 18 has a top land 19 which is narrower than its bottom land 20.

The surface of the piston above land 19 of groove 18 is referred to as the top land 21 of the piston. The top land 21 of the piston has a combustion head 21; and a multitapered face. The uppermost taper 22 of the face which comprises 20% of the vertical height of the head above ring 17 is tapered 6° toward the axis of the piston. Midsection 23 which comprises 25% of the vertical height of the piston head above ring 17 is parallel to the axis of piston 10. The lower section of the top land 24 which comprises 55% of the vertical height of the head above the top ring 17 is tapered 3° from the vertical. The remainder of piston 10 is conventional and includes the usual combustion dish and could include intake and exhaust valve cutouts, not shown.

As it is well known and understood in the art, during the intake stroke of piston 10, not illustrated, a mixture of fuel and air is injected in combustion chamber 13. At the top of the compression stroke and during the firing stroke, the head of piston 10 is exposed to the explosive force of combustion and combustion gases. The combustion gases expand through orifice 25 but are blocked by top compression ring 17. This blockage causes a build-up of pressure in groove 18. Loading results and the forces pressing radially outward maintain compression ring 17 in contact with cylinder 11 and the forces passing axially downward maintain contact with land 20. The resultant seal between top ring 17 and cylinder 11 and land 20 reduces the lubricating oil consumption of the engine.

The relatively larger sections of orifice 25 bounded by tapers 22 and 24 result in the prevention of build-up of adherent load bearing carbon around piston 10. The smaller section of orifice 25 bounded by taper 23 reduces the dead space in the orifice and thereby causes a reduction in polluting emissions and smoke. Further, the reduced orifice area tends to decrease the amount of unburned fuel and this reduces carbon build-up, lowering wear and oil consumption.

Figure 4:
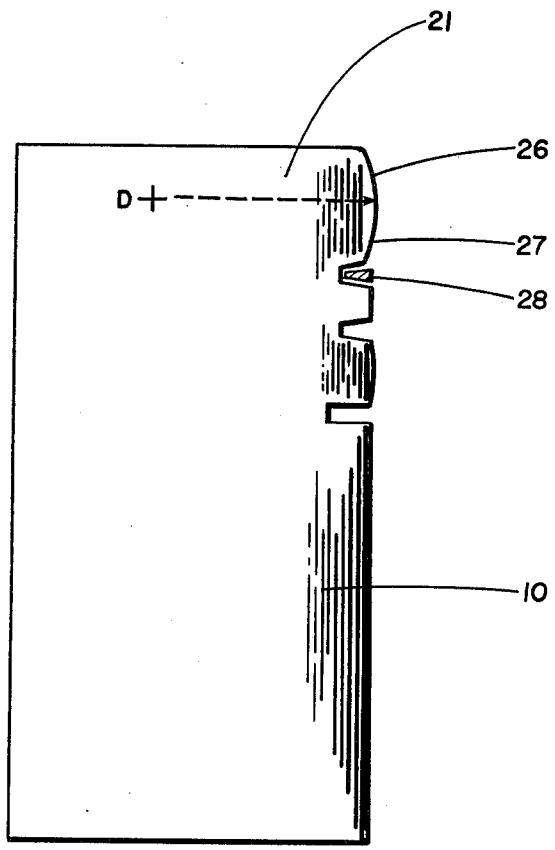
FIG. 4 is a partial plan view in elevation of an alternative embodiment of the present invention.

FIG. 4 shows an alternate embodiment of the invention. The double taper of top land 21 is formed by a curve which, in this embodiment, has a radius whose axis is in a horizontal plane. The radius of the curve measured from point D is 8 inches and can be from 1 inch to 20 inches. The uppermost taper 26 and the lower taper 27 comprise 100% of the vertical height of the head above top compression ring 28. The middle section is of nearly zero height being a line. The radius of curvature provides a controlled variation of the clearance about the head of the piston.

Figure 5:
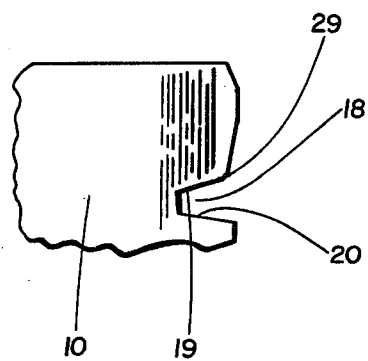
FIG. 5 is a partial plan view in elevation of an alternative embodiment of FIG. 3.

FIG. 5 shows a further alternate embodiment. In this embodiment, chamfer 29, which is 0.020 inches long and 45° from vertical, is machined at the outside diameter of the top land 19. Chamfer 29 cooperates in the control of oil for lubrication.

Thus, the use of the piston of the present invention permits an engine to operate at higher efficiency and burn more cleanly with a lower level of oil consumption. The piston of the present invention improves the efficiency of the engine due to the reduced dead volume and by minimizing the accumulation of load bearing carbon about the head of the piston.

What is claimed is:

1. An improved piston for internal combustion engines of the type containing a skirt, upper, compression ring and a combustion head wherein the improvement comprises a top land above the compression ring having a zoned diameter wherein the largest diameter zone of the top land is disposed between lesser diameter zones of said land, said lesser diameter zones terminating adjacent the upper compression ring and combustion head respectively.

2. The piston ring of claim 1 wherein the improvement includes:
   a. a top land having a first frusto-conical portion having its generated surface diverging outwardly from the axis of said piston;
   b. a second frusto-conical portion disposed axially with respect to said first portion, the generated surface of said second portion being substantially parallel to the axis of said piston; and
   c. a third frusto-conical portion disposed axially with respect to said second portion, the generated surface of said third portion diverging inwardly toward the axis of said portion.

3. The piston of claim 2 wherein said first portion comprises 10% to 40% of the vertical surface above the top compression ring and diverges outwardly 1° to 20° from the axis of the piston, said second portion comprises 10% to 50% of the vertical surface above the top compression ring; and said third portion comprises 40% to 70% of the vertical surface above the top compression ring, and diverges inwardly 1° to 20° toward the axis of the piston.

4. The piston of claim 3 wherein said third portion has a chamfer formed between its surface and the upper land of the top compression groove.

5. The piston of claim 1 wherein the improvement includes a top land having an arcuate surface starting at the top of said combustion head and continuing in a continuous arc into the top compression ring groove whose axis is in the horizontal plane.

6. The piston of claim 5 wherein the radius of said surface is from 1 to 20 inches.

7. The piston of claim 5 wherein the radius of the surface is 8 inches.

* * * * *